US005781983A

United States Patent [19]
Grüner

[11] Patent Number: 5,781,983
[45] Date of Patent: Jul. 21, 1998

[54] MACHINING CENTER

[76] Inventor: Magnus Grüner, Panoramastrasse 10, 73337 Bad Überkingen, Germany

[21] Appl. No.: 765,311
[22] PCT Filed: Jun. 20, 1995
[86] PCT No.: PCT/EP95/02385
   § 371 Date: Dec. 30, 1996
   § 102(e) Date: Dec. 30, 1996
[87] PCT Pub. No.: WO96/00633
   PCT Pub. Date: Jan. 11, 1996

[30] Foreign Application Priority Data

Jun. 29, 1994 [DE] Germany ............... 44 22 416.8

[51] Int. Cl.⁶ ........................................ B23Q 7/00
[52] U.S. Cl. ................. 29/563; 29/33 P; 29/564; 409/137; 409/164
[58] Field of Search ................ 409/137, 163, 409/164; 29/33 P, 563, 564; 483/15

[56] References Cited

U.S. PATENT DOCUMENTS

| 3,543,392 | 12/1970 | Perry et al. ............... 29/564 |
| 4,494,298 | 1/1985 | Matsuura et al. ........... 29/563 |
| 4,749,116 | 6/1988 | Yajima ..................... 29/563 |
| 4,951,376 | 8/1990 | Grund ..................... 29/563 |
| 5,052,540 | 10/1991 | Matsuyama et al. ....... 29/33 P |
| 5,078,256 | 1/1992 | Hatano et al. ............ 409/137 |
| 5,153,973 | 10/1992 | Kitamura ................. 29/33 P |
| 5,321,874 | 6/1994 | Mills et al. .............. 409/164 |
| 5,347,704 | 9/1994 | Everlove et al. ......... 29/563 |
| 5,439,431 | 8/1995 | Hessbrüggen et al. . |
| 5,452,502 | 9/1995 | Walter et al. ............. 29/38 B |
| 5,543,242 | 8/1996 | Tsuchimoto et al. ...... 29/563 |

FOREIGN PATENT DOCUMENTS

| 0 088 645 | 9/1983 | European Pat. Off. . |
| 0 117 557 | 9/1984 | European Pat. Off. . |
| 0 219 107 | 4/1987 | European Pat. Off. . |
| 0 231 827 | 8/1987 | European Pat. Off. . |
| 2900650 | 7/1980 | Germany ............... 29/563 |
| 3140941 | 6/1982 | Germany ............... 29/564 |
| 34 16 660 | 11/1985 | Germany . |
| 40 22 458 | 1/1992 | Germany . |
| 57-107760 | 7/1982 | Japan ................... 29/564 |
| 2-36054 | 2/1990 | Japan ................... 29/563 |

OTHER PUBLICATIONS

Database WPI, Week 8605, 15 Feb. 1986, Derwent Publications Ltd., London, GB, Abstract No. 86-024505 & SU-A-1 166 965 (15 Jul. 1985).

Primary Examiner—A. L. Pitts
Assistant Examiner—Christopher Kirkman
Attorney, Agent, or Firm—Browdy and Neimark

[57] ABSTRACT

A machining center for the machining of workpieces (26). It comprises at least one work unit (22) with a rotary tool (24) for machining a workpiece (26) arranged in a machining zone (28). The workpiece (26) is secured to a workpiece carrier (15), which for this purpose possesses a holding device (25). The workpiece carrier (15) may be moved into a workpiece change station (25), wherein workpiece change may take place. During workpiece change the workpieces (26) are picked up and put down from above by the holding device (25). During machining the workpiece (26) is hangingly held on the workpiece carrier (15). The machining center ensures high productivity and minimum complexity for operation.

17 Claims, 4 Drawing Sheets

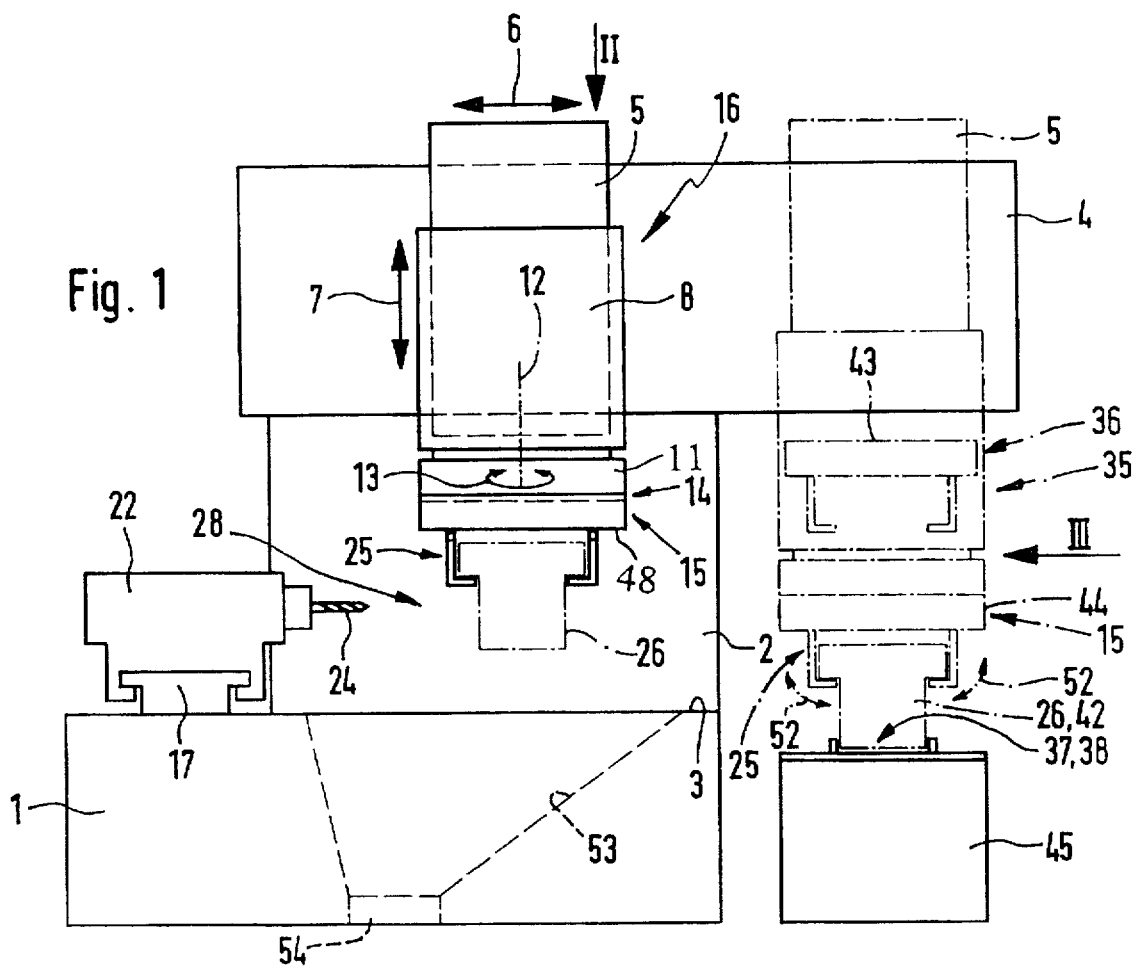
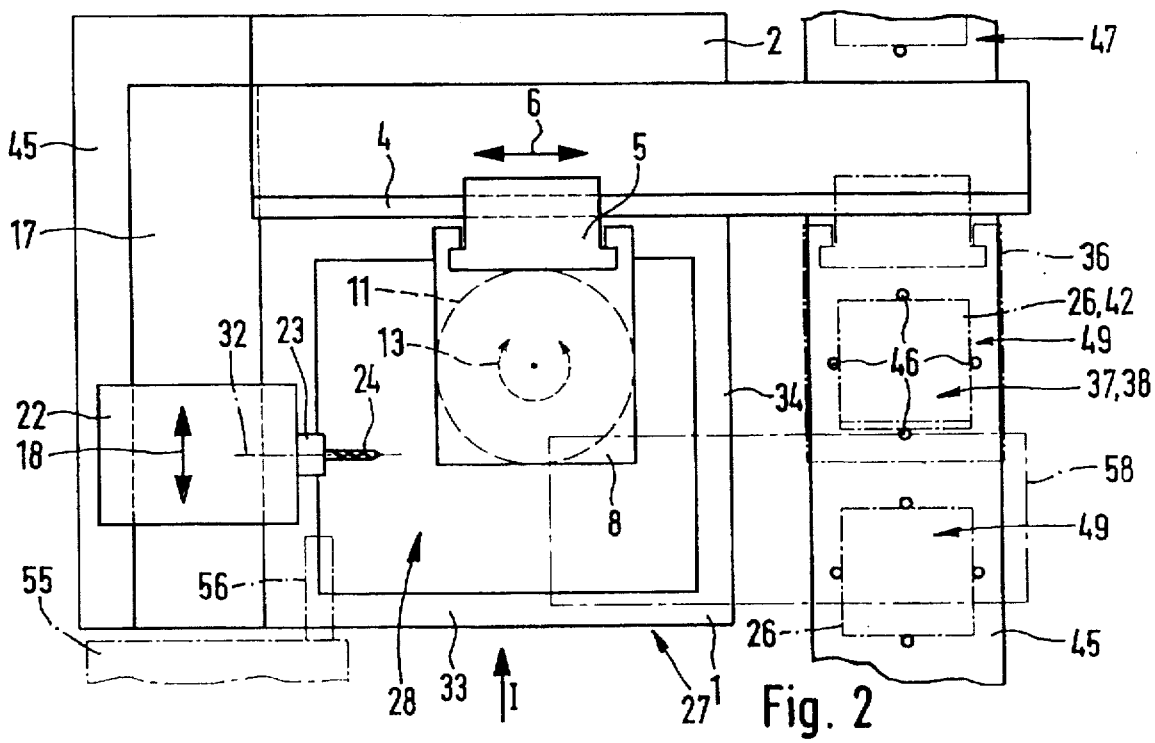

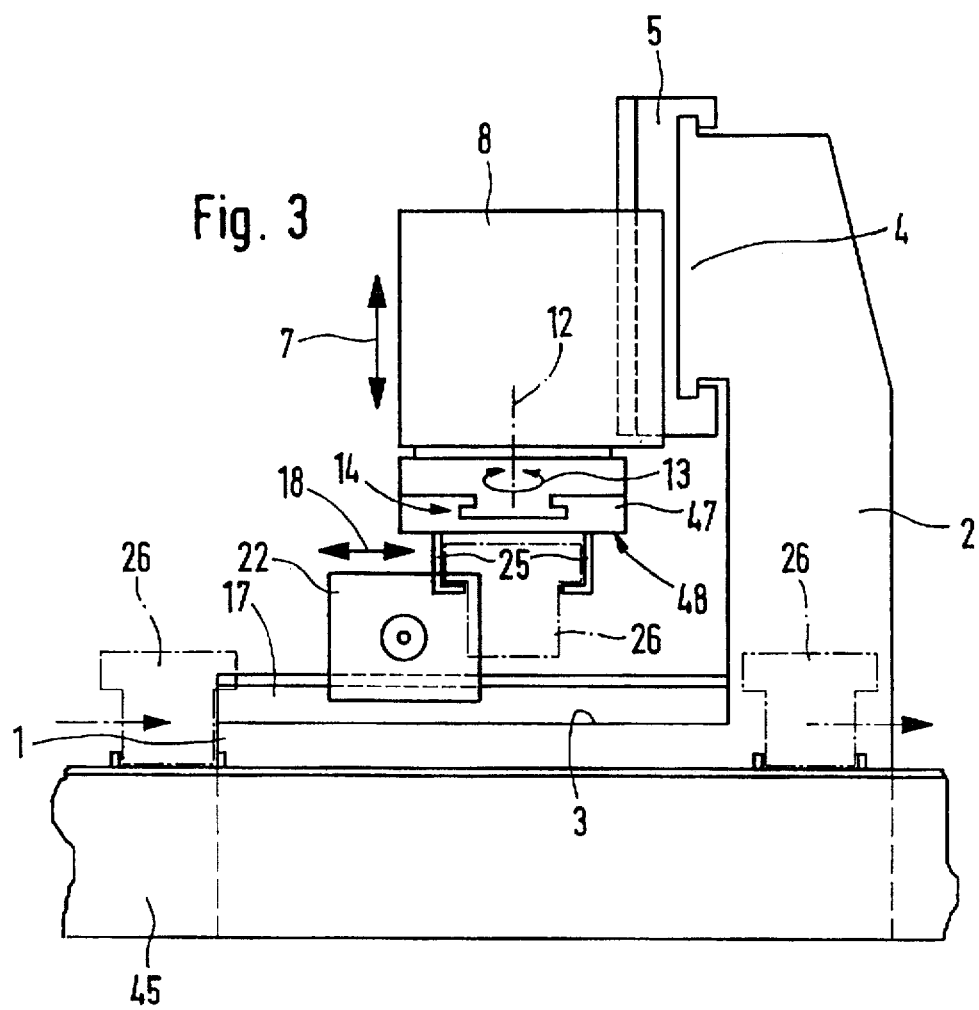
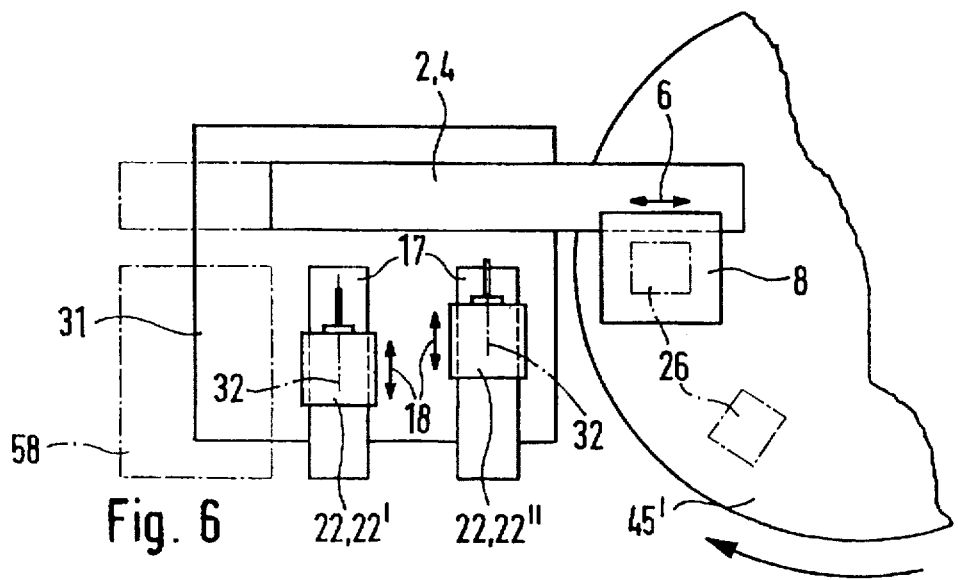

MACHINING CENTER

BACKGROUND OF THE INVENTION

1. Field of the Invention

The invention relates to a machining center for machining workpieces, comprising at least one work unit having at least one work spindle able to be driven in rotation and adapted to be fitted with a machining tool, with which tool at least one workpiece arranged in the machining zone may be machined, a workpiece carrier on which the workpiece may be releasably held by means of a holding device arranged on the workpiece carrier, the work unit and the workpiece carrier being able to be shifted in relation to one another, a conveying and positioning device for the workpiece carrier by which the workpiece carrier is able to be shifted between the machining zone and a workpiece change station located outside the machining zone, and a gripper for the change over a from workpieces to be machined to workpieces already machined, the gripper receiving the workpiece from above or from the side, lifting the same and conveying it into the machining zone and, after machining, depositing it at a workpiece deposit site in the workpiece change station from above or from the side.

2. Prior Art

A machining center of this type is constituted by the machine tool described in the European patent publication 0 088 645 A1. Such a machine tool additionally possesses further machine parts permitting the use thereof as a vertical lathe with a rotating workpiece and a stationary tool. To the extent that it is relevant for the machining center of the type initially mentioned, this known machine comprises a workpiece carrier formed by an indexing head and a workpiece change station arranged adjacent to it and constituted by a magazine. A gripper changes over the unmachined and machined workpieces between the workpiece change station and the workpiece carrier. The tool employed for machining is held on the rotating working spindle of one work unit.

During the machining of a workpiece the gripper assumes a standby position outside the machining zone. It must consequently, for each workpiece change, be shifted, directly before and after machining engagement of the tool, between the standby position and the machining zone. The time spent for this has an unfavorable effect on workpiece re-tooling times and accordingly on the overall workpiece machining times. Furthermore, it is a relatively complex matter to free the workpiece carrier, constantly remaining in the machining zone, of shavings, something which results in an increase in the time expended.

OBJECT ONE SUMMARY OF THE INVENTION

Accordingly one object of the present invention to create a machining center of the type initially mentioned, which while possessing a simpler structure leads to shorter workpiece machining times also simplifies removal of shavings.

In order to attain this object a holding device on the workpiece carrier is provided which constitutes the gripper and the gripper moves the workpiece into machining engagement. The workpiece, which is respectively to be machined, remains constantly on the gripper from pickup until renewed deposit in the workpiece change station and accordingly also during intermediate machining by the machining tool which is arranged on the at least one rotating work spindle of the work unit. The workpiece carrier is arranged replaceably on the positioning device jointly with the holding device.

It is in this manner that a separate gripper as in the prior art for moving the workpieces between the workpiece change station and the machining zone is no longer needed. The holding device on the workpiece carrier has a double function since it serves both for handling during conveyance of the workpieces into and out of the machining zone and also for holding the workpiece during machining. The gripper constituted by the holding device itself collects the workpieces to be machined and itself also returns same after machining, it moving same into machining engagement in the meantime. Since no idle travel of the gripper is involved, as a whole the workpiece machining time can be generally reduced.

This accordingly alone leads to high workpiece machining rates and a correspondingly high productivity using but one single workpiece carrier. Since the workpieces may now also be machined while hanging, a large proportion of the shaving produced may fall down freely under their own weight without fouling the holding device or, respectively, the gripper and the holding and support surface adjacent to same.

This renders possible a simplified disposal of shavings while simultaneously reducing the effort involved in cleaning prior to clamping a new workpiece in place. All in all the invention provides a "pickup" system since the workpiece carrier using its holding device itself collects and takes up the workpiece to be machined.

In order to render possible rapid re-tooling of the machining center for handling other workpieces, the workpiece carrier is preferably arranged in a replaceable fashion on the positioning device. It may then be exchanged jointly with the holding device provided on it and replaced by a workpiece carrier with a differently designed holding device.

Although in the machine tool of the said European patent publication 0 088 645 A1, in the case of use as a vertical lathe, the respective workpiece to be machined is taken from the magazine by the chuck itself after machining is returned, this application is however restricted to lathe operation with the chuck rotating and the tool stationary. In the case of use as a machining center of the type initially mentioned recourse is had to an additional gripper for handling the workpieces.

The same applies for the machine tool disclosed in the German patent publication 4,022,458 A1. Here the workpiece carrier, rotating during use, is arranged underneath the stationary machining tool and is supplied with a workpiece with the aid of a gripper. Although the time required for such supply is shorter than in the case of the said European patent publication 0 088 645 A1, since two grippers are present, the greater technical complexity of the machine does lead to a substantial increase in the costs of such machine tool.

Furthermore the German patent publication 3,416,660 A1 had also made a proposal to collect the workpieces in a single clamping operation from the workpiece magazine, to machine them and to replace them. Again it is a question however only of a lathe, which grips the workpieces with the chuck connected with the operating spindle. A further point is that in this lathe there is no provision of the possibility of replacement of a workpiece carrier necessary for machining centers together with the holding device.

The workpiece get-ready site in the workpiece change station, from which the workpiece carrier takes the respective workpiece to be worked, can be identical with the workpiece deposit site.

It is convenient for the workpiece carrier to also comprise a chuck plate also termed a palette, which is arranged hangingly on the conveying and positioning device, the holding device being located on the lower side thereof. In order to ensure optimum removal of shavings it is preferred to provide a shavings receiving passage underneath the machining zone, such passage opening if, desired, into a conveying device conveying away the shavings as same are produced.

The at least one work unit present may have a single spindle or a multiple spindle design. A single spindle design is more particularly employed for high speed machining, a system preferably being employed, in which the spindle and the motor are collected together as a single unit. It is more especially in the case of single spindle designs to provide several and more particularly two such work units for simultaneous operation, which are more particularly arranged in one horizontal plane adjacent to one another and work independently of each other. Thus for example the one work unit may perform a machining operation, whereas as regards the work unit not presently in use a tool change is carried out.

In order to facilitate re-tooling, it is to be recommended to carry out re-tooling with a workpiece carrier and exchange device, which has a workpiece carrier magazine associated with it. The exchange of the workpiece carriers between the workpiece exchange device and the workpiece carrier magazine may for example be carried out by hand or with a suitable auxiliary device.

In order to render possible rapid re-tooling of the machining center for handling other workpieces, the workpiece carrier is preferably arranged in a replaceable fashion on the positioning device. It may then be exchanged jointly with the holding device provided on it and replaced by a workpiece carrier with a differently designed holding device. In order to facilitate re-tooling, it is to be recommended to carry out re-tooling with a workpiece carrier and exchange device, which has a workpiece carrier magazine associated with it. The exchange of the workpiece carriers between the workpiece exchange device and the workpiece carrier magazine may for example be carried out by hand or with a suitable auxiliary device.

A preferred embodiment of the invention provides the workpiece carrier arranged on a boom-like portion of the positioning device in order to offer as much space as possible for movement of the workpiece carrier.

SHORT DESCRIPTION OF THE DRAWINGS

In the following the invention will be explained with reference to the accompanying drawings.

FIG. 1 is a front view of a preferred design of the machining center looking in the direction as indicated by the arrow I in FIG. 2.

FIG. 2 is plan view of the machining center looking in the direction as indicated by the arrow II in FIG. 1.

FIG. 3 is a side elevation of the machining center looking in the direction as indicated by the arrow III in FIG. 1.

FIG. 6 is a plan view on a smaller scale of a further embodiment of the machining center.

DETAILED DESCRIPTION OF THE PREFERRED EMBODIMENT(S) OF THE INVENTION

Figure 4:
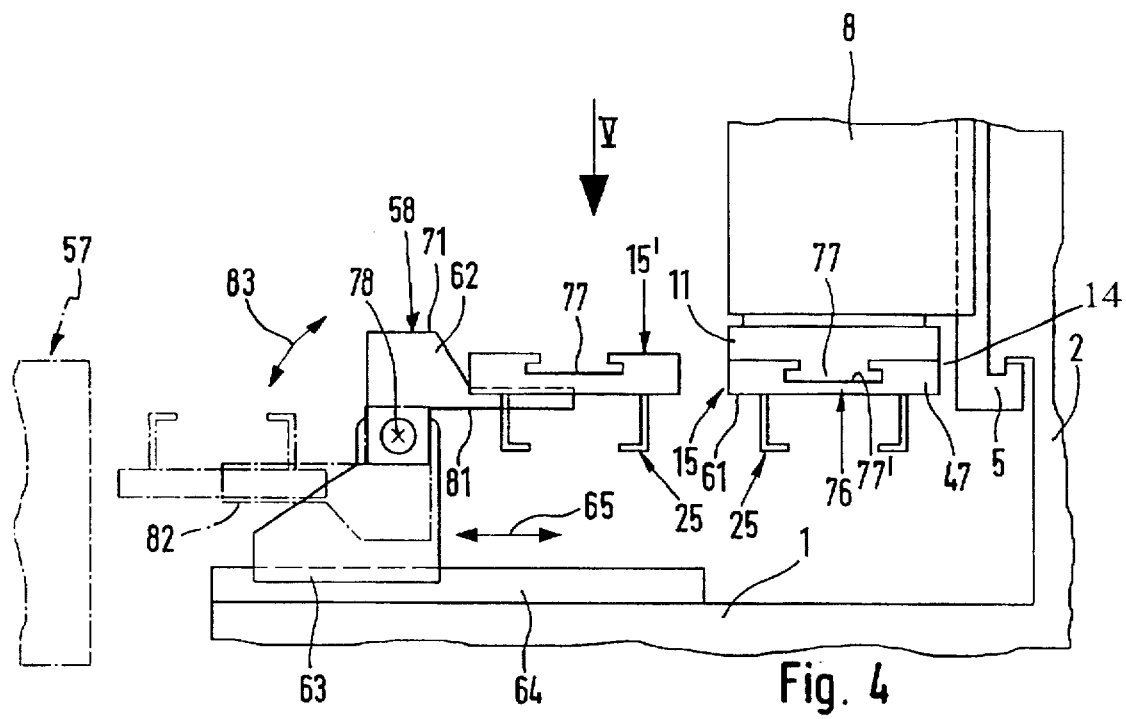
FIG. 4 shows the workpiece carrier change device which is not, or only diagrammatically, illustrated in FIGS. 1 through 3 to render same more straightforward in a sectioned side view looking in the direction as indicated by the arrow III.

All figures are diagrammatic. More particularly, no attempt has been made to represent the necessary drive and control means, which as such are known and may be provided by the man in the art as desired.

The machining center depicted in FIGS. 1 through 5 comprises a table or base 1 at whose rear side an upwardly extending carrier 2 is provided. In the top part of the carrier and at a vertical distance from the top side 3 of the base there is a first horizontal guide 4, which is for example rail-like. On it a vertical guide 5 is mounted for horizontal linear movement, the corresponding first horizontal direction of movement being indicated by a double arrow 6.

On the vertical guide 5 a rider 8 guided for movement in a vertical direction as indicated by a double arrow 7.

On the bottom side of the rider 8 a turntable 11 is arranged. It is able to be turned about a vertical axis 12 in relation to the rider 8. The direction of rotation is indicated by a double arrow 13.

On the turntable 11, in the present case of the bottom side thereof, a workpiece carrier 15 is detachably attached with the aid of a coupling device 14. The turntable 11, the rider 8, the vertical guide 5 and the first horizontal guide 4 form a positioning device generally referenced 16 for the workpiece carrier 15 coupled therewith. The latter may be consequently shifted in the directions 6, 7 and 13 as required in order to be brought into a desired position. A second horizontal guide 17 is provided on the base 1 adjacent to top side 3 of the base. Such horizontal guide extends, as seen in plan view, at a right angle to the first horizontal guide 4. The horizontal guide mounts a work unit 22 which is able to be reciprocated, as indicated by the double arrow 18, in its longitudinal direction in a second horizontal direction of movement. In the present example it is a question of a single spindle work unit, which possesses one work spindle 23, on which the desired machining tool 24 is mounted in a detachable manner. By means of a drive motor, not illustrated, which is integrated in the work unit 22 it is possible to drive the work spindle 23, and accordingly the machining tool 24, in a known manner to perform a rotary movement. In the present case the design of the motor permits high speed machining.

Instead of the single spindle work unit 22 it is also possible to provide a multiple spindle work unit, which is able to be simultaneously fitted with a plurality of machining tools driven in rotation.

The workpiece carrier 15 mounts a holding device 25 so that so that a workpiece 26 to be machined may be clamped in a predetermined position on the workpiece carrier 15. This position will be termed the carrier position. The above mentioned degrees 6, 7, and 13 18 of freedom render possible relative motion between the machining tool 24 and the workpiece 26 located in the carrier position so that the workpiece can be worked in any desired manner by bringing the machining tool 24 into engagement with it in the appropriate fashion.

The vertical guide 5 and the rider 8 are attached at the front on the first horizontal guide 4 with the result that the rider 8, together with the turntable 11 (preferably mounted thereon) protrudes like a boom to the front (FIG. 3). This means that the workpiece carrier 15, together with the workpiece 26 in the carrier position, is held with a clearance above the top side 3 of the base and in front of the carrier 2. Therefore the portion, which is located above the base 1 and represents the machining zone 28, is substantially accessible from the front side 27 and may be inspected.

In the present example the arrangement is such that the first horizontal direction 6 of movement extends in the width direction of the base 1 and accordingly in terms of FIG. 2 from the left to the right. The second horizontal direction 18 of movement extends in the depth direction of the base 1 between the front side and the rear side. In the example the second horizontal guide 17 is arranged in the left hand marginal part of the base 1 and the axis 32 of the rotation of the work spindle 23 extends in parallelism to the first horizontal direction 6 of motion. The machining zone 28, as considered in plan view in FIG. 2, is surrounded by the first and the second horizontal guide 4 and 17 and furthermore by the front and the right hand edge 33 and 34 of the base 1.

The positioning device 16 serves not only for positioning the workpiece 26 during machining, but also for changing the position of the coupled workpiece carrier 15 between the above mentioned machining zone 28 and a workpiece change station 35. The latter is located preferably clear of the machining zone 28 and in the present embodiment of the invention is, in terms of the plan view of FIG. 2, to the side of the right hand side edge 34. In the workpiece change station 35 workpiece changing is possible with respect to the workpiece carrier 15, i.e. the workpiece previously located in the carrier position is replaced after machining by the next workpiece to be machined. There is an exchange of workpieces.

The first horizontal guide 4 extends laterally beyond the right hand side edge 34 so that the vertical guide 5 is able to be moved, together with workpiece carrier 15, along this first horizontal guide 4 into the workpiece change station 35. The workpiece change position assumed in the workpiece change station 35 is indicated in FIGS. 1 and 2 in broken lines at 36.

In the workpiece change position 36 the workpiece carrier 15 assumes a position vertically above a workpiece get-ready site 37 provided in the workpiece change station 35. In order to provide the empty workpiece carrier 15 with a workpiece 26, the corresponding workpiece 26 is arranged a get-ready position 42 at a get-ready site 37. After this the workpiece carrier 15 located in the workpiece change position 36 is moved from a standby site 43, at a distance above the workpiece 26, in a direction 7 of vertical movement downward into a receiving position 44; in which it grips the workpiece 26 with its holding device 25 and clamps it. The grasping of the workpiece 26 thus takes place in a downward direction directly by the holding device 25 which hence simultaneously performs a gripper function. In the position, in which the holding device 25 has the workpiece 26 transferred to it from the get-ready position 42, the workpiece 26, remains clamped and held on the workpiece carrier 15- until, after machining has been completed, it is deposited in the workpiece change station 35. The workpiece 26 held in the get-ready position 42 is lifted by vertical upward motion of the rider 8 away from the workpiece get-ready site 37 and henceforward assumes a hanging position on the workpiece carrier 15 until it is returned to the workpiece change station 35.

Such return is performed in the reverse order of movements, the workpiece carrier 15 firstly being moved back into the workpiece change position 36 so that it is located in a standby position 43 above and clear of a workpiece deposit site 38 in the workpiece change station 35. This workpiece deposit site 38 is preferably identical with the workpiece get-ready site 37 so that by, lowering the workpiece carrier 15, the machined workpiece is deposited back in a position corresponding to the preceding get-ready position 42.

It will be clear that the workpiece deposit site 38 does not necessarily have to be identical with the workpiece get-ready site 37. More particularly in the case of continuous supply of workpieces 26 and if the workpiece get-ready site 37 can not be always kept free during machining of the workpiece collected from it, it is recommended to select a different workpiece deposit site 38. This different site will then preferably be to the side of the workpiece get-ready site 37 or, however, given a suitable extension of the first horizontal guide 4, adjacent to the left hand side edge 45 of the base 1. It will be clear from this that the workpiece change station 35 does not necessarily have to be a single constructional unit and it may certainly be sub-divided into a plurality of station parts separated from each other in space. In one station part it is then possible for instance for the grasping of the workpiece, which might be referred to as a "pickup" function" to occur, whereas in the other station part the release of the machined workpiece takes place.

The transfer of the workpiece 26 to be machined into the workpiece get-ready site 37 is preferably performed with the aid of a workpiece conveying device 45, which in the present working example of the invention in accordance with FIGS. 1 through 5 is designed in the form of a conveyor belt, which runs through the workpiece change station 35 and moves past the machining center to the side adjacent to right hand side edge 34. It is possible to arrange a plurality of the machining centers one after the other in the depth direction so that the conveyor belt moves past all of same and the workpieces to be machined may be removed by the respective machining center. The workpiece conveying device 45 may in this case practically represent a low-cost workpiece magazine, which makes do without expensive workpiece palettes equipped with holding devices.

In the case of the embodiment of FIG. 6 a workpiece conveying device 45', designed in the form of a round indexing table, is provided, the workpieces 26 being able to be arranged on a turntable for running through the workpiece change station 35 in sequence.

In order to ensure reliable acceptance of the workpieces 26 by the workpiece carrier 15 in the workpiece change station 35, it is recommended to get the workpiece 26 ready, respectively located at the workpiece get-ready site 37, using positioning means 46 to assume a predetermined alignment. In this respect it may be a question of positioning or locating pins, which set a certain angular alignment of the workpiece 26. If the workpieces 26 are supplied by means of a workpiece conveying device 45 and 45', it is convenient to provide corresponding positioning means 46 at each workpiece site 49.

In the case of the preferred embodiment the workpiece carrier 15 comprises a base plate, termed a chuck plate, which, with its top side foremost, is fixedly clamped on the turntable 11, the plane of the plate extending at a right angle to the vertical axis 12 of rotation. The holding device 25 is provided on the bottom plate face 48 which faces downward in the coupled position. The position is assumed by the workpiece carrier 15 also in the workpiece change position 36 so that for accepting a workpiece 26 one vertical movement is sufficient, the holding device 25 being laid downwardly on the workpiece 26 positioned in the workpiece get-ready site 37. The holding device 25 itself may be fitted in a conventional fashion with suitable, for example hydraulic, holding mechanisms and comprise the necessary holding and abutment faces so that grasping and clamping of the workpiece 26 may take place in the course of automatic operation of the machining center. The necessary holding and, respectively, grasping movements are indicated in FIG. 1 by the double arrows 52.

Since the workpiece 26 is worked hangingly in the machining zone, by far the greatest part of the resulting shavings will fall downward so that they will not foul the holding device 25. In the illustrated working embodiment the shavings are received in a shaving passage 53, which is located underneath the machining zone 28 and is preferably integrated in the base 1. The shavings receiving passage 53 may taper in a funnel-like manner downward and for instance open into a conveying device constituted by a conveyor belt, such device extending horizontally and clearing the shavings produced from the machining center.

The machining center may furthermore be provided with a tool magazine 55 holding ready a number of machining tools, with which the work unit 22 may be selectively fitted as desired. The fitting of the tools itself is then conveniently performed with the aid of a suitable tool changer 56.

It will be clear from the embodiment in accordance with FIG. 6 that the machining center may readily be equipped with a plurality of work units 22. As shown in FIG. 6 two such work units 22' and 22" are provided, which are each able to be changed in position as indicated by the double arrow 18 on a second horizontal guide 17 like the arrangement in FIGS. 1 through 5. In this case they are arranged in the front part of the front side 27 of the base 1 so that they are opposite to the carrier 2 in the depth direction of the base 1. The axes of the rotation of the work units 22' and 22", which in the present case as well are single spindled, extend, unlike the case of the design in accordance with FIGS. 1 through 5, parallel to the second horizontal direction 18 of movement.

The machining center in the present example is only equipped with one single workpiece carrier 15, which in sequence is loaded with the workpieces 26 to be machined. Since, owing to the acceptance and release of the workpiece taking place in vertical direction, workpiece change may be performed by the holding device 25 itself automatically, the workpiece change being extremely short so that it is possible to do without any further workpiece carriers and without any alternate shifting into the machining zone. This means that there is a reduction in costs, since per workpiece type only one single workpiece carrier is required.

It is however an advantage if the workpiece carrier 15 of the machining center is replaceable or interchangeable. This renders possible an exchange for re-tooling the machining center for work on another type of workpiece to be machined. Therefore in the working embodiment the workpiece carrier 15 is detachably secured via the coupling device 14 to the turntable 11 and if required may be replaced by another workpiece carrier 15' which has a holding device adapted for other workpieces. Particulars will be seen from FIGS. 4 and 5.

In accordance with this the machining center is preferably equipped with a workpiece carrier magazine 57, which is arranged at a suitable point adjacent to the base 1. In it workpiece carriers with a differently designed holding device 25 are held available for use. The changing of the workpiece carriers preferably takes place mechanically, for which reason the machining center given as an example herein is provided with a suitable workpiece carrier change device 58. It renders it possible to remove a workpiece carrier 15, arranged in a working position 61 and presently at the positioning device 16, from such working position 61 and in place thereof to couple up another workpiece carrier 15' with the position device 16, which is then loaded so that this new workpiece carrier 15' will assume the working position 61 indicated in FIGS. 1 through 5. It is preferred for the workpiece carrier change device 58 also to at least partially perform the shifting of the workpiece carriers 15 and 15' into and out of the workpiece carrier magazine 57.

In the illustrated working embodiment the workpiece carrier change device 58 is arranged adjacent to right hand edge 34 of the base 1. It possesses a holder 62, which using a horizontal carriage 63 on a carriage guide 64, extending horizontally and linearly, is able to be shifted as indicated by the double arrow 65 in parallelism to the second horizontal direction 18 of motion. The carriage guide 64 is preferably arranged on the base 1. On the holder 62 two loading sites 66 and 67 are provided, which are respectively suitable for detachably accepting or, respectively, holding a workpiece carrier 15 and 15'. The holder 62, depicted by way of example, is bifurcated in design and possesses two adjacently placed recesses constituting the loading sites 66 and 67, which are open toward the front side of the holder. In order to hold a workpiece carrier in a loading site 66 and 67 the said workpiece carrier 15 is inserted from the open front side into the respective loading site 66 as indicated by the arrow 72. The removal of a held workpiece carrier is performed by withdrawal from the respective loading site 67 in the oppositely direction as indicated by the arrow 73. The directions 72 and 73 of insertion and of withdrawal run in parallelism to the horizontal direction 65 of motion of the holder 62.

Figure 5:
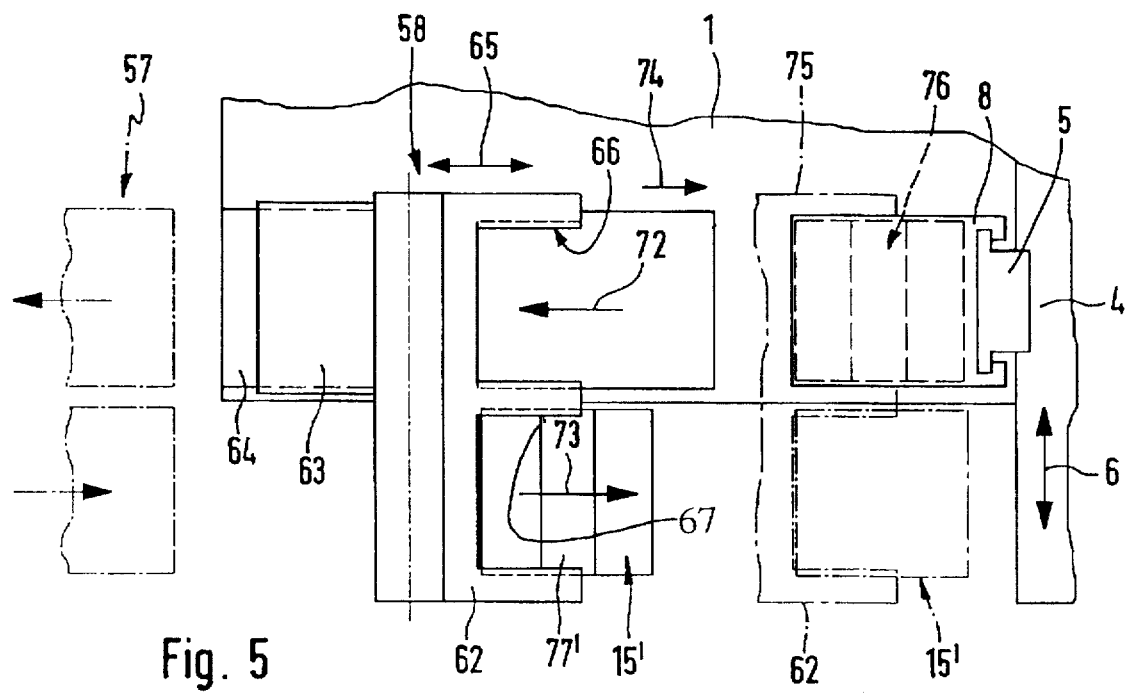
FIG. 5 is a plan view as indicated by the arrow V of the arrangement of FIG. 4.

The holder 62 is so arranged that the open front side of the loading sites 66 and 67 is directed toward the rear side of the base. Workpiece carrier replacement takes place as follows:

One of the loading sites 66 remains unoccupied, while the other loading site 67 is loaded with the new workpiece carrier 15'. Loading takes place in a home position 71, wherein the horizontal carriage 63 is arranged in the front base portion, as is generally shown in FIG. 4. Now the workpiece carrier 15, located in the work position 61, is so positioned by means of the positioning device 61 that it is horizontally directly opposite to the free loading site 66. This intermediate position is illustrated in FIG. 5. The next step is for the horizontal carriage 63 to be shifted toward the workpiece carrier 15 as indicated by the arrow 74 so that the workpiece carrier 15 is introduced into the free loading site 66. This intermediate position is as indicated in broken lines in FIG. 5 at 75. The new workpiece carrier held in the second loading site 67 is then in the horizontal direction 6 of motion alongside the workpiece carrier 15 to be removed.

The coupling device 14 is now unlocked and the turntable 11 is shifted in the horizontal direction 6 of movement while keeping to the same height toward the new workpiece carrier 15', the workpiece carrier 15, located in the working position 61, remaining in the first carrier site 66. During this lateral movement the coupling engagement with the workpiece carrier so far used is gradually released, while simultaneously coupling engagement with the new workpiece carrier 15' is caused to come into being until same assumes the working position 61. Now the coupling device 14 is re-locked and the new workpiece carrier 15' is securely fixed on the turntable 11.

In order to ensure that these movements take place in the illustrated working embodiment the coupling device 14 possesses a linear guide 76, which is made up of two complementary linear guide parts 77 and 77', which are able to be moved in relation to each other in the longitudinal direction while same are interlocked with each other. One of these linear guide parts 77 is provided on the turntable 11 and the other is provided on the clamping plate 47. The linear guide 76 may for example be designed in the form of a dovetail guide or, as illustrated, a T-section guide. The individual locking elements for locking the respective working position 61 are not illustrated in the drawings.

Once the new workpiece carrier 15' is locked in the working position 61, the holder 62 is moved back using horizontal carriage 63 from the intermediate position 75 into the home position 71. In this respect the new workpiece carrier 15' remains back on the turntable 11, while the old workpiece carrier 15 is kept in the associated loading site 66 and is also moved back as well. It is now possible for the machining center to start working the new type of workpiece using the new workpiece carrier 15'.

In preferred design the holder 62, which for example has a bifurcated, E-like outline as illustrated, is able to be pivoted between a change position as indicated in continuous lines in FIG. 4, and a loading position 82 as indicated in broken lines, the pivot axis 78 preferably being a horizontal axis. In the change position 81 the holder 62 assumes the above described position, in which the loading sites 66 and 67 have their open front sides facing the rear side of the base. In order to ensure that there is no interference by the holder 62 and the workpiece carrier secured thereto, the holder 62 may be pivoted about the horizontal pivot axis 78 as indicated by the double arrow 83 into the loading position 82, the angle of pivot being for example 180 degrees. The holder 62 is accordingly turned facing the workpiece carrier magazine 57 and the old workpiece carrier 15 can be placed in the workpiece carrier magazine 57. Similarly in the loading position 83 the workpiece carrier to be used next, can be held at one of the loading sites 66 and 67.

In the case of an arrangement of the work units 22, 22' and 22" as shown in FIG. 6, it may be useful if the workpiece carrier change device 58 is positioned adjacent to the opposite left hand side margin 31 of the base 1. This is free here, since the work units 22' and 22" are arranged in the front portion of the machining center. In order to be able to implement an optimum workpiece carrier change in this case the first horizontal guide 4 should however be extended so far to the left that the rider 8 can be positioned in the depth direction 18 in relation to the workpiece carrier change device 58.

Figure 8:
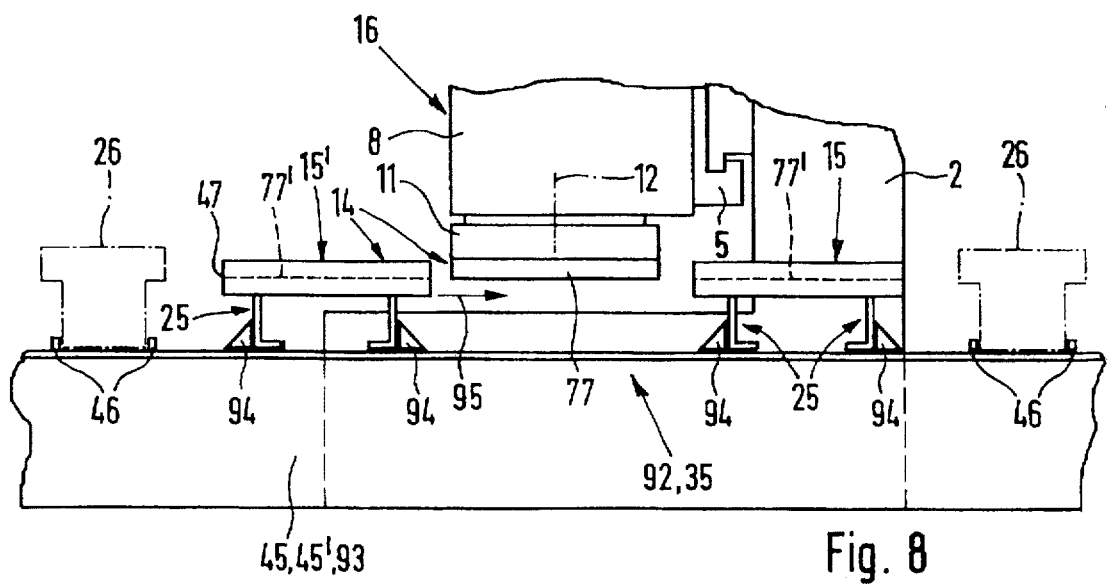
FIG. 8 shows a further modification of the machining center.

FIG. 8 indicates a further design structure of the machining center in a side elevation more or less looking in the same direction of the arrow III of FIG. 1, such design rendering possible a particularly low-cost workpiece carrier change method. The change operation is here undertaken in a workpiece carrier change station 92, through which a supply device 93 runs, with which said supply device serving the workpiece carrier respectively no longer required 15 may be conveyed away and the workpiece carrier 15', which as the next one is to be secured in the working position on the positioning device 16 and, respectively, the turntable 11, is supplied. In accordance with the preferred embodiment of the working example the workpiece carrier change station 92 is identical to the workpiece change station 35 and the supply device 93 is the workpiece conveying device 45 and 45'. On the latter, in addition to the positioning means 46 for workpieces 26, several holding devices 94 are arranged, with which one respective workpiece carrier 15 and 15' may be so secured that when same moves through the workpiece carrier change station 92 it assumes an alignment which is suitable for the change. It is preferred for the workpiece carrier 15', secured in a holding device 94, to be so arranged and aligned that the holding device 25 is downwardly directed, the plane of the plate of the clamping plate 47 extending in a horizontal plane and the linear guide part 77' is preferably aligned in the advance direction 95 of the supply device 93. The holding device 94 preferably cooperates with the holding device.

In order to load the free positioning device 16 with a workpiece carrier 15' the positioning device 16 is preferably so positioned in the workpiece carrier change station 92 that the linear guide part 77 provided thereon is at the same level as the linear guide part 77' of the workpiece carrier 15', which is just arriving, and is also aligned in the advance direction 95. Using its linear guide part 77' the moving supply device 93 then automatically thrusts the workpiece carrier 15', which is just arriving, onto the linear guide part 77 on the turntable 11. Once the desired working position has been reached, the coupling device 14, which is not illustrated in detail, is actuated and the workpiece carrier 15' is lifted by upward movement of the turntable 11 clear of the holding device 94.

In like manner a workpiece carrier 15 no longer required in the workpiece carrier change station 92 may be passed on to a holding device 94. It is convenient for the positioning device 16 to directly place the workpiece carrier 15 in a holding device 94. Simultaneously the coupling device is released so that the moving supply device 93 draws the workpiece carrier 15 off the linear guide part 77. Simultaneously it is possible in this case for the next workpiece carrier 15' to be already pushed off on to positioning device 16.

It will be clear that the workpiece carrier change may be coordinated with other kinetic sequences, more particularly in a manner dependent on the design of the coupling device 14. It would for example be conceivable for the threading in and out of the linear guide system 77 and 77' to be undertaken at a right angle to the advance direction 95, i.e. in the first horizontal direction of movement 6. In this case the workpiece carriers 15 and 15' and the turntable 11 would have to be set with a 90° offset about the vertical axis in relation to the positions shown in FIG. 8. The positioning device 16 would then best firstly deposit the workpiece carrier 15, which is no longer required, on the supply device 93 and then move back somewhat so that the "new" workpiece carrier 15' could arrive at the change site and could be received by the turntable.

Given a corresponding design of the coupling device 14, for instance without the linear guide parts 77 and 77', the change operation could also readily be undertaken exclusively as part of a vertical movement of the turntable. The workpiece carrier 15, which is no longer required, is deposited at a change site from above on the supply device 93 and, after decoupling, conveyed away. Following this the next workpiece carrier 15' is conveyed to the change site, coupled from above by the positioning device 16 and lifted.

It is an advantage in this design that there is no need for a complex, customized workpiece carrier change device 58, because workpiece carrier change may be implemented by means of the positioning device 16 itself using the workpiece conveying device 45 and 45', present in any case. For instance, following the last workpiece 26 to be machined it is merely necessary to arrange the next workpiece carrier 15 on the workpiece conveying device 45 and 45' so that following the last workpiece change, a workpiece carrier change may be undertaken, also in the pickup system.

It is even possible to implement the workpiece carrier change with the workpiece secured in the holding device 25. In this case the workpiece carriers 15 are held over the respective workpiece 26 at the workpiece conveying device 45 and 45' and the holding devices 94 will be practically constituted by the positioning means 46, which directly, by way of the associated workpiece 26, also hold the respective workpiece carrier.

The machining center taken as an example renders possible workpiece processing with only one single workpiece carrier and only one holding device arranged thereon, which is more particularly hydraulically or pneumatically operated. The workpieces not in the process of being machined do not have to be held in a complex and high-cost holding device, and same may be supplied to the workpiece change station using simple conveying means and removed from same again. It is sufficient to provide simple positioning means in order to ensure a certain basic alignment which in turn ensures that the workpieces arriving at the workpiece get-ready site 37 in each case possess the same alignment, which permits direct grasping by the holding device of the workpiece carrier 15, whose position is able to be changed in the vertical direction. The machining center renders possible fully automatic workpiece machining without human operators for workpiece change. The workpiece carrier itself picks up the workpieces to be machined and itself clamps them in the carrier position.

It will be clear that the machining center may readily be provided with still further degrees of freedom or, respectively, axes. For instance it would be feasible to further subdivide the workpiece carrier 15 or the turntable 11 and to link the two parts with a transverse shaft extending at a right angle to the vertical shaft 12, it being possible for such transverse shaft to extend obliquely, that is to say not at a right angle to the vertical shaft 12. Accordingly the holding device 25 may, in case of need, also be so positioned in the course of machining so that it is not directed vertically downward but (also) laterally, the plate surface 48, which during tool changing is directed downward, being directed to the side.

Figure 7:
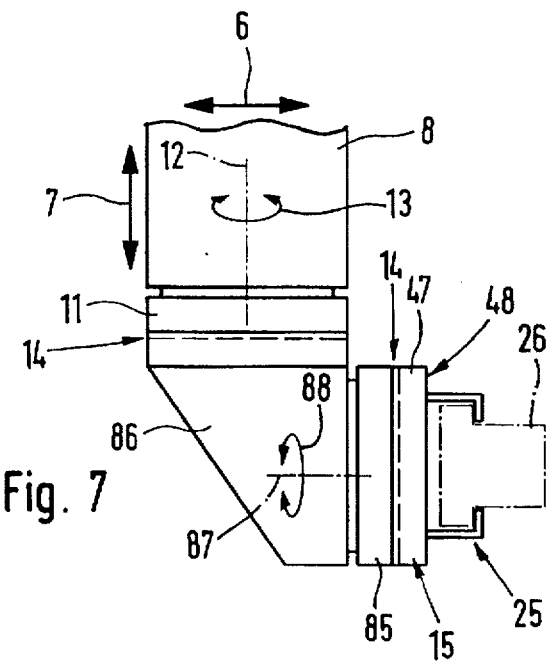
FIG. 7 shows a customized arrangement of the workpiece carrier.

FIG. 7 shows a modified arrangement of the workpiece carrier 15. In this case it is not set directly on the above mentioned turntable 11, but on a second turntable 85, which using an angle head 86 is secured on the said first turntable 11. The second turntable 85 is able to be rotated about a horizontal rotary shaft 87, extending rectangle to the vertical shaft 12, in relation to the angle head 86, which for its part is able to be rotated about the vertical shaft 12. By way of its clamping plate 47 via the coupling device 14 of the above mentioned type the workpiece carrier 15 is detachably secured to the second turntable 85, whereas the angle head 46 is fixedly secured to the first turntable 11 by means of a corresponding coupling device 14. The workpiece carrier 15 may now be turned additionally as indicated by the double arrow 88 about the horizontal rotary shaft 87. This means that it is practically possible to machine to practically any angle in space and to carry out machining on five sides of the workpiece 26.

In this respect the workpiece carrier 15 is so aligned that the plane of the clamping plate 47 is horizontally aligned and the plate surface 48, with the holding device 25 arranged thereon, is directed horizontally sideways.

In order in the case of such an arrangement or alignment of the workpiece carrier 15 to receive a respective workpiece, which is to be machined, in the workpiece change station 35, the workpiece located at the workpiece get-ready site 37 is engaged from the side by the holding device 25. The workpiece carrier 15 is moved by the positioning device 16 into the workpiece change station 35, then lowered until it is arranged alongside the workpiece 26 to be picked up and then moved by a horizontal lateral movement toward the workpiece 26, which for its part is gripped by the holding device 25 itself. Now the workpiece carrier 15 is lifted by the positioning device 16 and the workpiece 26 is moved into the machining zone. Deposit of the workpiece 26 after machining is performed in a corresponding fashion.

I claim:

1. A machining center for machining workpieces (26), comprising at least one work unit (22, 22' and 22") having at least one work spindle (23) able to be driven in rotation and adapted to be fitted with a machining tool (24) with which at least one workpiece (26) arranged in a machining zone (28) may be machined, a workpiece carrier (15) on which the workpiece may be releasably held by means of a holding device (25) arranged on the workpiece carrier (15), the work unit (22, 22' and 22") and the workpiece carrier (15) being able to be shifted in relation to one another, a positioning device (16) for the workpiece carrier (15) by which the workpiece carrier (15) is able to be shifted between the machining zone (28) and a workpiece change station (35) located outside the machining zone (28), and a gripper for the change over from workpieces (26) to be machined and workpieces already machined, the gripper receiving the workpiece (26) from a workpiece get-ready site (37) in the workpiece change station (35) from above or from the side, lifting the same and conveying it into the machining zone (28) and, after machining, depositing it at a workpiece deposit site (38) in the workpiece change over station (35) from above or from the side, wherein the holding device (25) on the workpiece carrier (15) constitutes the gripper and the gripper moves the workpiece (26) into machining engagement, the respective workpiece (26), which is respectively to be machined, remaining constantly on the gripper (25) from pickup until renewed deposit in the workpiece change station and accordingly also during intermediate machining by the machining tool (24) which is arranged on the rotating work spindle (23) of the work unit (22, 22' and 22") and in that the workpiece carrier (15) is arranged in a replaceable manner on the positioning device (16) jointly with the holding device (25);

wherein one workpiece carrier change station (92) is provided, wherein the positioning device (16) picks up the workpiece carrier (15') required for a machining operation, from a supply device (93) of the workpiece carrier change station (92).

2. The machining center as claimed in claim 1, wherein the workpiece get-ready site (37) is identical to the workpiece deposit site (38).

3. The machining center as claimed in claim 1, comprising a workpiece conveying device (45 and 45') for the supply and removal of workpieces (26) which are to be machined or are already machined into and, respectively, from the workpiece change station (35), wherein said workpiece chance station is a conveyor belt or in the form of a round indexing table.

4. The machining center as claimed in claim 1, wherein the workpiece carrier (15) comprises a clamping plate (47), on whose bottom side (48) the holding device (25) is arranged.

5. The machining center as claimed in claim 1, wherein a shaving receiving passage (53) is provided underneath the machining zone (28).

6. The machining center as claimed in claim 1, wherein the axis of rotation (32) of the work spindle (23) of the at least one work unit (22, 22' and 22") is horizontally aligned.

7. The machining center as claimed in claim 1, comprises at least two adjacently placed and independently driven work units (22' and 22").

8. The machining center as claimed in claim 1, wherein the workpiece carrier (15) is mounted by way of a linear guide (76) on the positioning device (16), and moveable along such linear guide (76) for replacement.

9. The machining center as claimed in claim 1, wherein the supply device (93) stores workpiece carriers (15) which are no longer required on the positioning device (16).

10. The machining center as claimed in claim 12, wherein the workpiece carrier change station (92) is identical to the workpiece change station (35), the supply device (93) being constituted by the workpiece conveying device (45 and 45').

11. The machining center as claimed in claim 10, wherein the workpiece conveying device (45 and 45') of at least one holding device (94) for the workpiece carriers (15 and 15') which are to be supplied and removed.

12. The machining center as claimed in claim 1, wherein the workpiece carrier (15) is able to be moved by the positioning device (16) bearing it in the vertical direction (7) and in a first horizontal direction (6) of movement and in that the work unit (22) is able to be moved in a second horizontal direction (18) of movement perpendicular to such directions, the workpiece carrier (15) being able to be also rotated about a vertical axis (12).

13. The machining center as claimed in claim 1, wherein the at least one work unit (22, 22' and 22") has a workpiece magazine (55) and a tool changer.

14. A machining center for machining workpieces (26), comprising at least one work unit (22, 22' and 22") having at least one work spindle (23) able to be driven in rotation and adapted to be fitted with a machining tool (24) with which at least one workpiece (26) arranged in a machining zone (28) may be machined, a workpiece carrier (15) on which the workpiece may be releasably held by means of a holding device (25) arranged on the workpiece carrier (15), the work unit (22, 22' and 22") and the workpiece carrier (15) being able to be shifted in relation to one another, a positioning device (16) for the workpiece carrier (15) by which the workpiece carrier (15) is able to be shifted between the machining zone (28) and a workpiece change station (35) located outside the machining zone (28), and a gripper for the change over from workpieces (26) to be machined and workpieces already machined, the gripper receiving the workpiece (26) from a workpiece get-ready site (37) in the workpiece change station (35) from above or from the side, lifting the same and conveying it into the machining zone (28) and, after machining, depositing it at a workpiece deposit site (38) in the workpiece change over station (35) from above or from the side, wherein the holding device (25) on the workpiece carrier (15) constitutes the gripper and the gripper moves the workpiece (26) into machining engagement, the respective workpiece (26), which is respectively to be machined, remaining constantly on the gripper (25) from pickup until renewed deposit in the workpiece change station and accordingly also during intermediate machining by the machining tool (24) which is arranged on the rotating work spindle (23) of the work unit (22, 22' and 22") and in that the workpiece carrier (15) is arranged in a replaceable manner on the positioning device (16) jointly with the holding device (25);

wherein one workpiece carrier change device (58) is provided;

wherein the workpiece carrier change device (58) possesses a bifurcated holder (62) with two loading sites (66 and 67) for workpiece carriers (15 and 15').

15. The machining center as claimed in claim 14, wherein the holder (62) is able to be displaced toward the workpiece carrier (15) arranged on the positioning device (16) and in an opposite direction therefrom.

16. The machining center as claimed in claim 15, wherein the holder (62) is able to be pivoted between a change position and a loading position (63), about a horizontal axis (78).

17. A machining center for machining workpieces (26), comprising at least one work unit (22, 22' and 22") having at least one work spindle (23) able to be driven in rotation and adapted to be fitted with a machining tool (24) with which at least one workpiece (26) arranged in a machining zone (28) may be machined, a workpiece carrier (15) on which the workpiece may be releasably held by means of a holding device (25) arranged on the workpiece carrier (15), the work unit (22, 22' and 22") and the workpiece carrier (15) being able to be shifted in relation to one another, a positioning device (16) for the workpiece carrier (15) by which the workpiece carrier (15) is able to be shifted between the machining zone (28) and a workpiece change station (35) located outside the machining zone (28), and a gripper for the change over from workpieces (26) to be machined and workpieces already machined, the gripper receiving the workpiece (26) from a workpiece get-ready site (37) in the workpiece change station (35) from above or from the side, lifting the same and conveying it into the machining zone (28) and, after machining, depositing it at a workpiece deposit site (38) in the workpiece change over station (35) from above or from the side, wherein the holding device (25) on the workpiece carrier (15) constitutes the gripper and the gripper moves the workpiece (26) into machining engagement, the respective workpiece (26), which is respectively to be machined, remaining constantly on the gripper (25) from pickup until renewed deposit in the workpiece change station and accordingly also during intermediate machining by the machining tool (24) which is arranged on the rotating work spindle (23) of the work unit (22, 22' and 22") and in that the workpiece carrier (15) is arranged in a replaceable manner on the positioning device (16) jointly with the holding device (25);

wherein one workpiece carrier change device (58) is provided;

wherein the workpiece carrier change device (58) has an associated workpiece carrier magazine (57) for workpiece carriers (15 and 15') with different holding devices (25).

\* \* \* \* \*